United States Patent [19]

Alvernhe

[11] Patent Number: 4,582,353
[45] Date of Patent: Apr. 15, 1986

[54] SUCTION CUP FOR GRIPPING SMALL, DELICATE OBJECTS

[75] Inventor: Gilles Alvernhe, Nancy, France

[73] Assignee: Pont-a-Mousson S.A., Nancy, France

[21] Appl. No.: 617,665

[22] Filed: Jun. 6, 1984

[30] Foreign Application Priority Data

Jun. 17, 1983 [FR] France ................. 83 10210

[51] Int. Cl.[4] ................ B25J 15/06; B66C 1/02
[52] U.S. Cl. ................................ 294/64.1
[58] Field of Search .............. 294/64 R, 65; 248/362, 248/363; 269/21; 271/90; 279/3; 414/627, 744 B, 752; 901/40

[56] References Cited

U.S. PATENT DOCUMENTS

| | | | |
|---|---|---|---|
| 1,448,690 | 3/1923 | Hetzer et al. .................. | 294/64 R |
| 2,623,773 | 12/1952 | Melzer .......................... | 294/64 R |
| 2,798,757 | 7/1957 | Jackson ......................... | 294/64 R |
| 2,850,279 | 9/1958 | Stoothoff et al. .............. | 294/64 R X |
| 3,174,789 | 3/1965 | Scherr .......................... | 294/64 R |
| 3,330,589 | 7/1967 | Mumma ....................... | 294/64 R |

FOREIGN PATENT DOCUMENTS 2610664  9/1977  Fed. Rep. of Germany .... 294/64 R

*Primary Examiner*—Johnny D. Cherry
*Attorney, Agent, or Firm*—Sughrue, Mion, Zinn, Macpeak and Seas

[57] ABSTRACT

A tubular silicone suction cup comprises a cylindrical body 9 tapering to an outwardly flared cone 11 at its lower end lined with a thin, flexible biconical latex skirt 20 extending below the cone, the skirt adapting to complex shapes of objects to be grasped, such as small confectionery or food items.

11 Claims, 5 Drawing Figures

SUCTION CUP FOR GRIPPING SMALL, DELICATE OBJECTS

BACKGROUND OF THE INVENTION

This invention relates to a suction cup for gripping and handling small, delicate objects, such as chocolate candies, for rapidly transferring them from a mold to a storage bin where they remain until they are packaged. To achieve this, one or more suction cups are mounted at the end of a high speed robot arm or industrial processing device. The suction cup is of the flexible, elastic, conical gripping type, and grasps the object by suction through a vacuum tube installed on the robot.

The problem of handling and gripping small, delicate confectionery and food objects as well as pharmaceutical items, for example, is particularly difficult to resolve given that the suction cup must meet all of the following criteria:

(1) it must grip the delicate object very gently to avoid damage;

(2) the suction cup must be adaptable to the various geometric shapes assumed by candy (cylindrical, multi-faceted, ovoid, spherical, multi-faceted with sharp ridges or rounded edges, smooth or grooved surfaces or surfaces displaying regular or irregular contours depending on the designs or items included on the candy's surface);

(3) the gripping or grasping action must be stable so that the object is retained in spite of the high-speed operation of the robot and the vibrations that may result at the end of the robot arm. The object grasped must also be held in stable position in order to maintain the position and orientation of the grip from the moment the candy is grasped until the time it is released, as well as during repeated processing operations, which requires a certain degree of rigidity together with the above-mentioned flexibility; and (4) the components of the suction cup must be made of sanitary materials suitable for use with foods and must be compatible with the small confectionery objects both in terms of chemical composition and compliance with regulations governing the handling of food products.

Most prior art suction cups for gripping small, delicate confectionery objects comprise a hollow cylindrical body having one end mounted on a robot arm or the like and attached to a vacuum line, and the other end flared in a trumpet or conical shape. Although such suction cups are made of deformable material their degree of flexibility is limited, and their flared or conical extremities can thus only be applied to relatively flat surfaces, as disclosed in French Pat. No. 2,126,174.

SUMMARY OF THE INVENTION

An object of this invention is thus to provide a suction cup for gently but positively gripping small, delicate objects, in particular confectionery objects, which is adaptable to many complex and irregular geometric shapes. The suction cup according to the invention comprises a deformable cylindrical body having a lower extremity in the form of a flared gripping cone, lined with a thin, highly flexible, biconical latex skirt which extends substantially below the cone.

DETAILED DESCRIPTION OF THE PREFERRED EMBODIMENT

Figure 1:
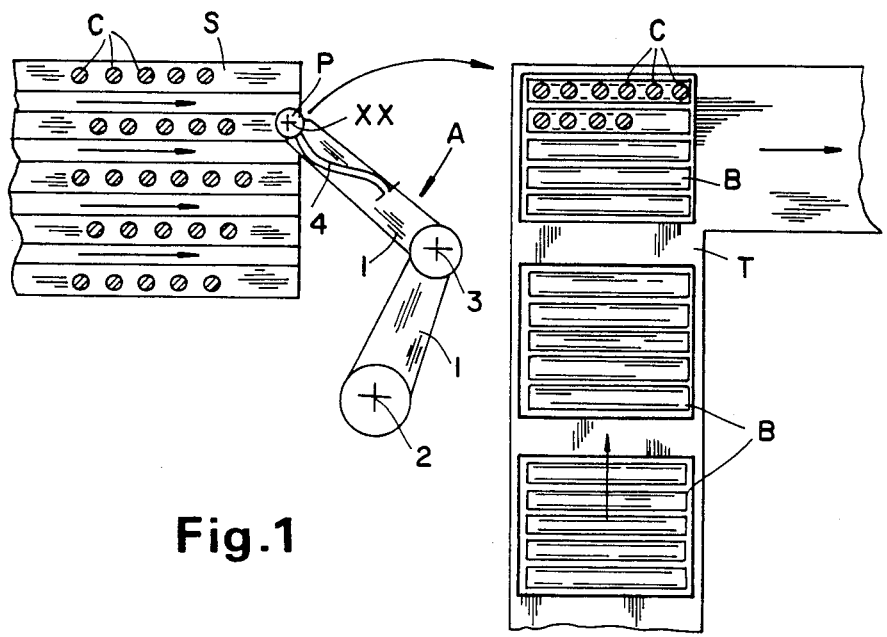
FIG. 1 is a schematic plan view of a chocolate candy processing facility wherein a gripping device according to the invention is disposed between the outlet of a manufacturing machine and a conveyor for transporting boxes in which the candies are to be placed.

In FIG. 1 the gripping device or suction cup according to the invention is used in a facility for transferring chocolate candies C between the outlet S of a molding machine having several parallel supply channels and a conveyor T which transports boxes B to be filled with the chocolates. The suction cup (not shown in FIG. 1) is installed at the wrist P of an articulated robot A comprising arms 1 articulated around a central pivot 2 and an elbow joint 3. The wrist axis XX may also be articulated in a conventional manner (not shown); the wrist is connected to a vacuum source by a tube or line 4.

Figure 2:
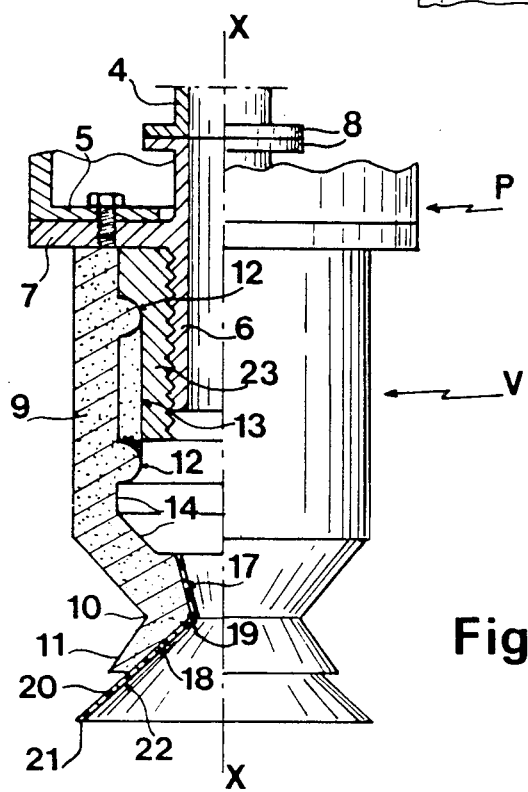
FIG. 2 is a half-section elevation of a suction cup according to the invention.

FIG. 2 shows, in more detail, the wrist P in the form of a hollow, cylindrical hub with an internal flange 5 accepting a filleted tubular metal casing 6 which connects the suction cup V according to the invention to the wrist. The casing 6 comprises a flange 7 which is affixed to the wrist flange 5 and a clamp 8 connected to a corresponding flange of the vacuum line 4.

The suction cup V according to the invention has a cylindrical body 9 compressed at its lower end into a circular neck 10 with sides having the shape of inverted cones; one converges toward the XX axis and the other diverges away therefrom. The diverging end of the suction cup below the neck 10 constitutes a centering or gripping cone 11. The cylindrical body 9, neck 10 and cone 11 of the suction cup is conventional, and may be made of a flexible elastic material such as silicone rubber with a hardness of 18° Shore A.

Figure 3:
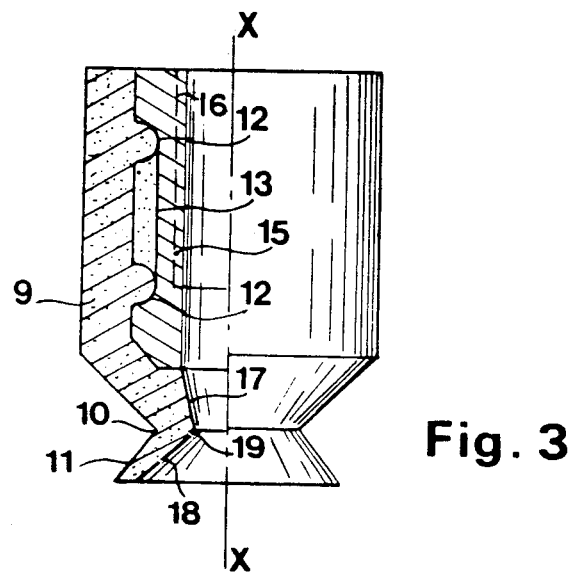
FIG. 3 is a half-section elevation of the suction cup during the molding thereof.

According to the invention, the body of the suction cup is hollow and comprises a complex inside surface of revolution obtained by a molding process and having the following characteristics, described from top to bottom:

The inside wall of the cylindrical body 9 carries two annular semi-circular protuberances 12 which position the body relative to a metal insert 23 described below. Between the two protuberances a plurality of circumferentially spaced longitudinal ribs 13 are provided parallel to the XX axis to form bridges between the protuberances, for example, four evenly distributed ribs. These ribs 13 compel at least the upper portion of the body 9 to rotate together with the metal insert 23 described below. Below the lower protuberance 12 which forms a neck in the body cavity a conical cylindrical chamber 14 is defined which corresponds to both the lower part of the body 9 and the convergent sides of the neck 10. This cavity of the suction cup V is obtained by molding using a tubular insert 15 (FIG. 3) or core made of metal, the exterior shapes of which correspond to the interior shapes of the body cavity. The internal wall of the insert is threaded at 16 so that it may be screwed onto a molding tool (not shown).

The lower part of the suction cup comprises a biconical internal cavity including an upper section 17 which converges toward the bottom, and a truncated conical lower section 18 which diverges toward the bottom. This biconical cavity thus defines a circular internal ridge 19 which retains the gripping device of the suction cup.

The gripping device proper according to the invention comprises a thin, flared skirt 20 made of an elastic material suitable for use with food products, such as natural latex. The thickness of the skirt is substantially less than that of the cone 11, and it is glued to the internal wall of the biconical body cavity with an adhesive such as "RHODORSIL primaire MB" sold by Rhone-Poulenc.

Using the analogy of a ladies' skirt, the skirt 20 comprises a narrowed waistband which is applied to the ridge 19 of the biconical cavity and a yoke which bears against the converging upper section 17. The skirt proper adopts the shape of the lower, divergent section 18 of the cavity and extends substantially below the centering cone 11, and is thus able to change shapes freely below the cone in order to apply itself to the objects to be gripped, both around a contact circle 21 formed of the large, lower base of the skirt and along the majority of its internal wall 22 located below the centering cone.

After removal of the molding insert 15 by deforming the flexible silicone body 9, a metal insert 23 is inserted into the body cavity, said insert having the same shape as the molding insert and consequently having the overall shape of a tubular casing with threaded interior walls, but which does not comprise a core form corresponding to the lower protuberance 12 or to the conical cylindrical chamber 14 so that the freedom of movement and flexibility of the elastomer body is not inhibited in its lower part. Consequently, the upper protuberance 12 and the ribs 13 adapt to the combined exterior shapes of the insert 23, which thus connects the flexible elastic body 9 of the suction cup to the filleted casing 6. The body 9 is literally anchored to the insert 23 by the upper protuberance and the ribs, so that it becomes an integral part thereof during translational and rotational motion. The insert, which grazes the upper end of the cylindrical body 9, screws onto the filleted casing 6. Suction may thus be exerted from the line 4 and the cavity of the casing 6 to the inside of the flexible skirt 20.

In operation, to grasp a small, delicate object C of any shape, for example a chocolate candy (FIG. 4), the suction cup V of robot A, which is not yet under vacuum, is brought into proximity with the object and lowered to apply the latex skirt 20 over the maximum possible surface area. A vacuum is then introduced into the cavity of the suction cup by the vacuum line 4 and the casing 6, whereupon the thin, flexible skirt then affixes itself more securely to the irregular surface of the object. It adapts to the most minute grooves, ridges, bumps, edges, hollows, folds and undulations and adheres strongly because of the vacuum, while this same vacuum causes the lower part of the cylindrical body 9 to become deformed or to fold and the cone 11 to come closer to the rigid insert 23. The upper part of the body 9 does not become deformed since it is supported by the insert 23.

The capacity of the thin skirt 20 to become so greatly deformed and the deformability of the lower part of the body 9 ensures the gripping of even a delicate object. After the initial deformation of the body 9 and the skirt 20, however, the applied vacuum renders the assembly of the suction cup and the object C or C1 relatively rigid.

The gripped object can be transported by the robot between an outlet S of the manufacturing machine and a packaging box B as illustrated in FIG. 1. The object is released by suddenly breaking the vacuum applied by the line 4 and the casing 6, and admitting dry filtered air into the cavity of the suction cup. The air rapidly invades the inside of the suction cup, inserting itself between the skirt 20 and the object C and enabling the lower part of the body 9 to elastically return to its normal shape (shown in FIG. 2). Although the skirt may remain against the object, it no longer adheres thereto. Lastly, the robot A removes the suction cup from the vicinity of the object to enable the grasping of another object in turn.

Figure 5:
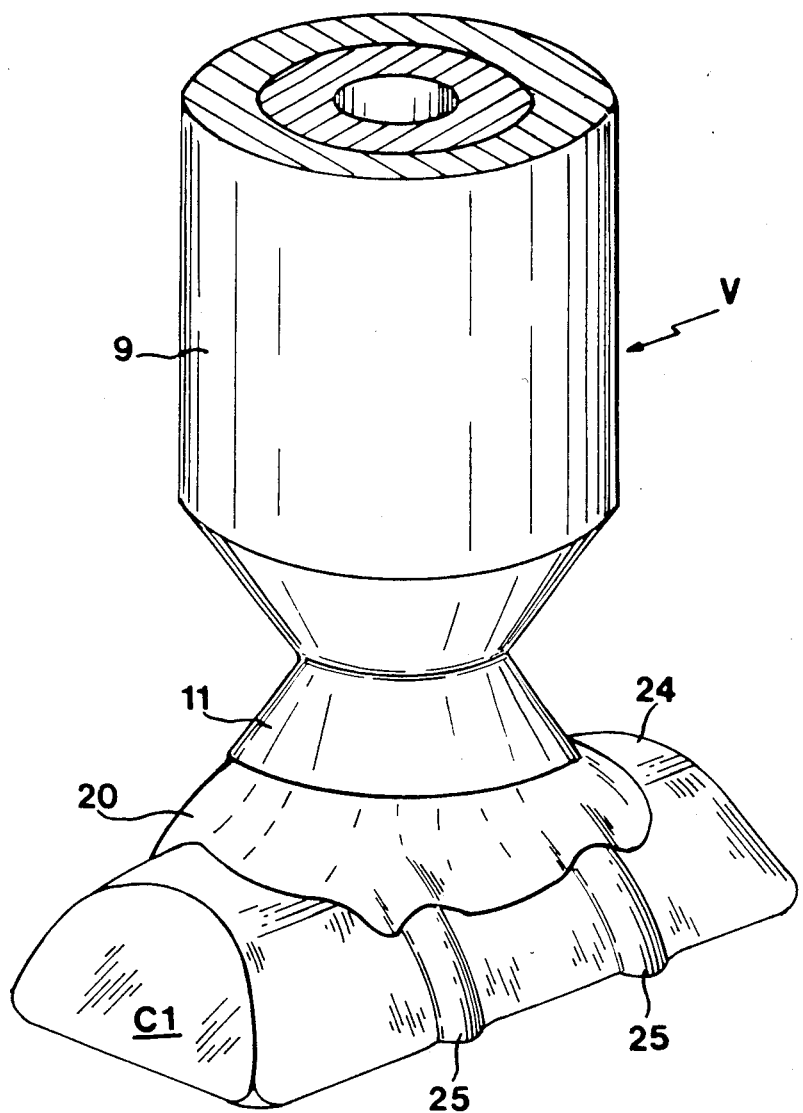
FIG. 5 is a perspective view on a larger scale of the suction cup picking up a small, ribbed object.

FIG. 5 illustrates the vacuum adherence of the skirt 20 onto an object C1 having a different shape: a cylindrical body 24 and two annular ridges or ribs 25.

Figure 4:
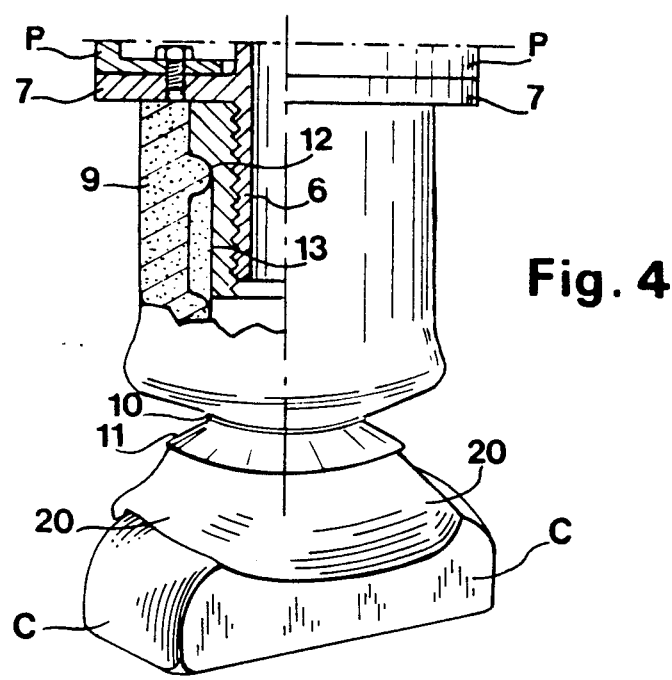
FIG. 4 is a partial perspective view corresponding to FIG. 2 showing the suction cup deformed in the process of grasping a small object of indefinite shape.

The elastically deformable body 9 and cone 11, and the even more deformable latex skirt 20 provide for a gentle gripping action which does not damage the object grasped, while still enabling a firm gripping action to implement reliable object transfer. Due to the ability of the thin, flexible latex skirt to become so extensively deformed, the suction cup V can adapt itself to various irregular geometric shapes as illustrated in FIGS. 4 and 5, even including a walnut, for example. The rigidity of the grip produced by the unitary assembly of the suction cup and object when under vacuum provides maximum grasping stability and prevents the grip from being released despite the high speed at which the robot operates and vibrations which may be produced at the end of the wrist P of the robot.

What is claimed is:

1. A suction cup for grasping small, delicate, irregularly shaped, non-planar objects, such as chocolate candies, comprising:

(a) a generally cylindrical, hollow body member (9) having an upper end adapted to be connected to a vacuum line (4), and a lower end initially tapering inwardly and then diverging outwardly to define an outwardly flared gripping cone (11), said body member and gripping cone being formed of a flexible and deformable elastic silicone material suitable for use with food products, and (b) an outwardly flared latex skirt (20) more deformable than said gripping cone lining an outwardly flared interior surface of the gripping cone and including a portion extending substantially beyond a lower edge thereof, said extended portion being sufficiently thick to remain self-supporting in a conical configuration and to prevent clogging ingestion into a mouth of said gripping cone upon application of vacuum, and sufficiently thin to matingly adapt and conform to varying irregular surface shapes of said objects being grasped, and a lower edge of said skirt being unstiffened and similarly adaptable and conformable.

2. A suction cup according to claim 1, wherein the interior surface of the body member defines a pair of axially spaced, coaxial, inwardly extending annular ridges (12), and a plurality of evenly circumferentially distributed, axially aligned, inwardly extending ribs (13) disposed between the ridges.

3. A suction cup according to claim 2, wherein the thickness of the skirt is substantially less than that of the lower edge of the cone.

4. A suction cup according to claim 2, further comprising a rigid cylindrical insert member (23) engagingly disposed within an upper portion of the hollow body member for constraining deformations thereof during use to a lower portion of the body member including the gripping cone.

5. A suction cup according to claim 4, wherein the member comprises a tubular metal insert (23) for connecting the body member to a vacuum tube, said insert having an external shape complementary to a portion of the interior surface of the body member, including the ribs and an upper one of the ridges.

6. A suction cup according to claim 5, wherein the thickness of the skirt is substantially less than that of the lower edge of the cone.

7. A suction cup according to claim 6, wherein the interior surfaces of the tapering lower end of the body member and the cone define a biconical cavity having a downwardly converging portion (17) joining a downwardly diverging lower portion (18) along a circular retention ridge (19), and wherein the skirt has a biconical configuration mating with that of the cavity.

8. A suction cup according to claim 1, wherein the thickness of the skirt is substantially less than that of the lower edge of the cone.

9. A suction cup according to claim 1, wherein the interior surfaces of the tapering lower end of the body member and the cone define a biconical cavity having a downwardly converging upper portion (17) joining a downwardly diverging lower portion (18) along a circular retention ridge (19), and wherein the skirt has a biconical configuration mating with that of the cavity.

10. A suction cup according to claim 9, wherein the thickness of the skirt is substantially less than that of the lower edge of the cone.

11. A suction cup according to claim 1, further comprising a rigid cylindrical insert member (23) engagingly disposed within an upper portion of the hollow body member for constraining deformations thereof during use to a lower portion of the body member including the gripping cone.

* * * * *